Nov. 26, 1940.  S. F. ARMINGTON  2,222,698
DUMP VEHICLE BODY MOUNTING
Filed June 24, 1939
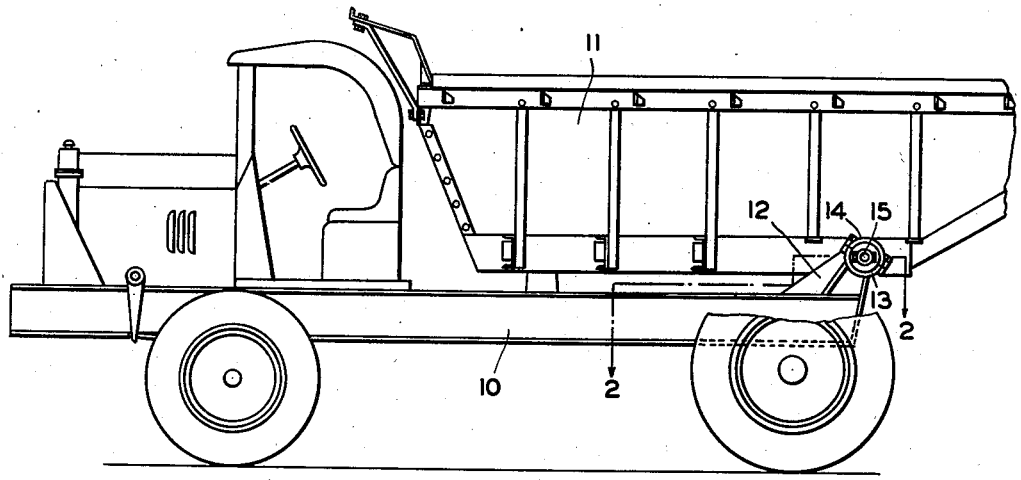
FIG.-1
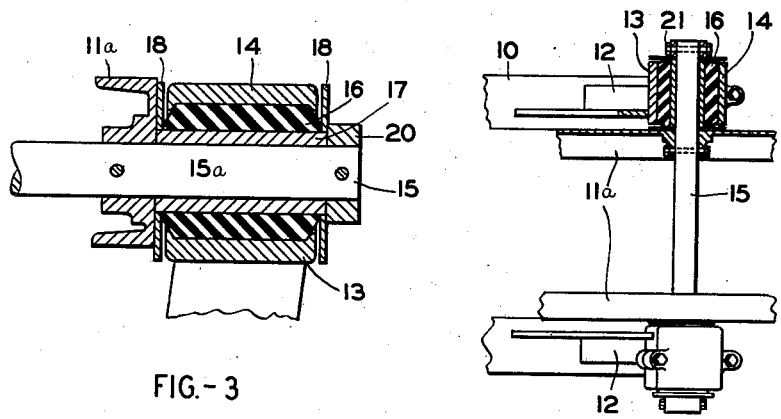
FIG.-3
FIG.-2
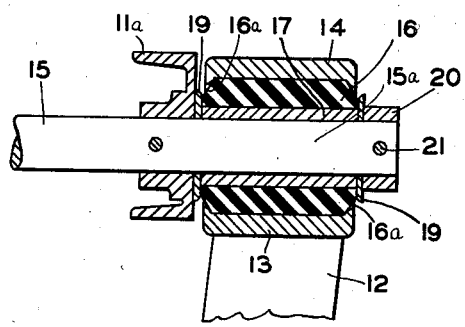
FIG.-4
INVENTOR.
STEWART F. ARMINGTON
BY
ATTORNEYS Patented Nov. 26, 1940

2,222,698

UNITED STATES PATENT OFFICE 2,222,698

DUMP VEHICLE BODY MOUNTING

Stewart F. Armington, Willoughby, Ohio, assignor to The Euclid Road Machinery Company, Euclid, Ohio, a corporation of Ohio Application June 24, 1939, Serial No. 280,945

3 Claims. (Cl. 298—17)

This invention relates to a dump vehicle body mounting of an improved type wherein a large portion of the weight in the body itself is sprung by supporting the same on a resilient material which at the same time forms a part of the bearing upon which the body is pivotally mounted for dumping action.

The invention comprises the mounting of the dumping end of a vehicle dump body in bearings comprising a rubber cushion which acts as spring means supporting a portion of the dump body load on the chassis and at the same time providing a portion of a novel bearing for the pivotal movement of the dumping action of the body with the attendant advantages set forth in the accompanying specification and claims.

Another object of the invention is the provision of a resilient bearing means at the body dumping pivot which provides novel effects in the supporting of the body load during transportation and dumping with important effects acting vertically and sometimes laterally on the resilient material.

In the drawing, Fig. 1 is a somewhat conventionalized side elevation of a rear dump vehicle in which the invention is incorporated; Fig. 2 is an enlarged view partly in plan and partly in section taken substantially along the line 2—2 of Fig. 1; Fig. 3 is a still further enlarged transverse vertical section through one of the bearing pivots; while Fig. 4 is a view like Fig. 3 showing a modification.

In the drawing, 10 represents generally the chassis of a vehicle of automotive type and 11 represents generally a load container body of bathtub shape suitable for handling earth or like materials. Rigidly mounted at the rear end of the chassis 10 is a pair of brackets 12, one at each side of the vehicle, each terminating at its upper end in half of a bearing sleeve or support 13. A cap 14 suitably secured in position by bolts forms the other half of the sleeve. A pin 15 is non-rotatably mounted in a suitable portion 11a of the framework of the dump body 11 as best indicated in Figs. 2 and 4. This pin has a cylindrical portion 15a at each end passing centrally through the sleeve 13, 14. Between each pin portion 15a and its associated supporting sleeve is a bushing or annular cushion 16 of resilient material, such as live rubber. Inasmuch as rotation of the body occurs about the pin or shaft 15, and the rubber cushion 16 will not stand much wear, I provide metallic bushings 17 which are in direct engagement with the pin portions 15a and rotate thereon. The cushion 16 fills the annular space between the outside diameter of each bushing 17 and the inside diameter of the supporting sleeve 13, 14. The parts are so proportioned that when cap 14 is bolted to the part 13, then the cushion 16 is compressed so that it tightly embraces the bushing 17. Thus, during a dumping operation, all relative rotation occurs between the bushing 17 and pin or shaft 15, and no relative rotation occurs between bushing 17 and the cushion 16.

In the form shown in Fig. 3, washers 18 are mounted on bushing 17 abutting the ends of cushion 16. These washers extend to positions alongside the lateral edges of the sleeve 13, 14 with little more clearance than is sufficient to permit free vertical movement between the body and chassis such as is made possible by the rubber cushion 16.

As shown in the modification of Fig. 4, I may combine the mounting of the rubber cushion 16 with the body connection so as to compensate for side sway or lateral movement of the body relative to the chassis. For this purpose the ends 16a of the rubber cushion are formed in frusto-conical shape and abut against washers 19 on shaft 15. The inner washer 19 abuts directly against the beam structure 11a of the body 11 and the outer washer 19 abuts against a collar 20 which is rigidly fixed to the shaft 15 as by the securing means 21. The washers 19 are of less radius than the washers 18 so as to clear the sleeve 13, 14. It results from this construction that side play of the body 11 in either direction is resiliently resisted by the end portions 16a of the cushion 16 where these portions abut the washers 19.

I have thus provided a resilient bearing means which acts as a load supporting means in the nature of a vertical spring; which also may act resiliently to resist side sway of the body; which forms a portion of the pivotal bearing about which the load dumps; and which reduces shock in the dumping operation.

What I claim is:

1. In a vehicle having a chassis unit and a dump body unit carried thereby, means mounting said body unit on said chassis unit for springing and for dumping comprising a pin carried by one of said units, a sleeve carried by the other of said units, the interior diameter of said sleeve being greater than the exterior diameter of said pin, a metal bushing in bearing contact with said pin, and a resilient annular cushion which when unstressed has a greater radial dimension than the distance between the exterior of said pin and the interior of said sleeve, said cushion when assembled being compressed between said metal bushing and said sleeve, whereby the load is transmitted from said pin to said sleeve and relative rotation occurs between said metal bushing and pin without relative rotation between said resilient cushion and the part on either side thereof.

2. In a vehicle having a chassis unit and a dump body unit carried thereby, means supporting said body unit on said chassis unit comprising a pin extending transversely of one of said units, sleeve supports alined transversely of the other of said units and surrounding portions of said pin, resilient cushions between said supports and pin, and abutments rigid with said pin bearing directly against the lateral faces of said cushions.

3. In a vehicle having a chassis unit and a dump body unit carried thereby, means supporting said body unit on said chassis unit comprising a pin member mounted on one of said units, a sleeve member mounted on the other of said units and surrounding said pin member, a resilient cushion between said pin and sleeve members, and an abutment rigidly movable with one of said members and bearing directly against a lateral face of said cushion and having clearance from the other of said members, whereby said cushion resiliently resists relative vertical and lateral motion between the units.

STEWART F. ARMINGTON.